United States Patent [19]

Ferenc et al.

[11] Patent Number: 5,711,732
[45] Date of Patent: Jan. 27, 1998

[54] CHAIN TENSIONER APPARATUS AND METHOD

[75] Inventors: Anthony S. Ferenc, Dearborn Heights; James D. Young, Chesaning, both of Mich.

[73] Assignee: Cloyes Gear and Products, Inc., Mentor, Ohio

[21] Appl. No.: 640,333

[22] Filed: Apr. 30, 1996

Related U.S. Application Data

[60] Provisional application No. 60/012,899 Mar. 6, 1996.
[51] Int. Cl.$^6$ ............................................. F16H 7/08
[52] U.S. Cl. ................................. 474/111; 474/101
[58] Field of Search ......................... 474/101, 111, 474/140

[56] References Cited

U.S. PATENT DOCUMENTS

| | | |
|---|---|---|
| 3,276,282 | 10/1966 | Duncan ............... 474/111 |
| 3,490,302 | 1/1970 | Turner et al. ........... 474/111 |
| 4,921,472 | 5/1990 | Young . |
| 5,055,088 | 10/1991 | Cradduck et al. ....... 474/111 |
| 5,266,066 | 11/1993 | White . |
| 5,286,234 | 2/1994 | Young . |
| 5,425,680 | 6/1995 | Young . |

*Primary Examiner*—Tamara L. Graysay
*Assistant Examiner*—Gary S. Hartmann
*Attorney, Agent, or Firm*—Fay, Sharpe, Beall, Fagan, Minnich & McKee

[57] ABSTRACT

A mechanical chain tensioner for automotive engine timing drives. This invention relates to a tensioner that must be packaged in a confined space and having limited access for installation. This tensioner with a shoe and spring is the last timing component to be installed and fastened to the engine using a shoulder bolt, and this is done after its support bracket, if used, and the timing chain and sprockets are already in place. In addition, the tensioner includes a retaining feature that assures the spring will remain within the shoe during shipping, installation, and use of the tensioner.

29 Claims, 8 Drawing Sheets

CHAIN TENSIONER APPARATUS AND METHOD

CROSS REFERENCES TO RELATED APPLICATIONS

This application claims the benefit of U.S. Provisional Application Ser. No. 60/012,899 filed Mar. 6, 1996.

BACKGROUND OF THE INVENTION

The subject invention is directed toward the art of chain power drives and, more particularly, to a chain tensioner for applying a tensioning force to a chain traveling therepast, and a related method of installation (and removal, if necessary) useful in confined spaces where a removable laterally affixed cover is not provided. The subject invention provides a convenient easily insertable assembly taking advantage of minimal accessibility to the chain, sprockets and area therebetween. While the invention is particularly directed to the art of chain power drives, and will be thus described with specific reference thereto, it will be appreciated that the invention may have usefulness in other fields and applications.

Chain guide and tensioner are used in numerous applications including on timing chain assemblies on internal combustion engines. The design, order and method of installation for a chain tensioner is determined by the packaging parameters and clearances in the engine, as well as the accessibility of the sprockets and area therebetween for installation. In addition, the availability of areas in which to fasten the chain guide and tensioning apparatus is also important.

A review of the art finds that in some engines, the chain tensioner is the last part installed and is typically fastened outside the chain path. A cover is then affixed over the chain, sprockets, and chain tensioner and bolted or otherwise affixed to the engine block and/or one of the engine heads.

In other engines, the chain guide and tensioning apparatus are incorporated in the same assembly where both a tensioning apparatus for the chain slack strand and a fixed guide for the taut strand are both mounted on the same bracket. This arrangement typically requires that the chain guide and tensioner assembly must be installed on the engine prior to the installation of the chain and sprockets. Similarly, on other engines, the packaging constraints and fastener location also require that the tensioner be fastened to the engine prior to the chain and sprockets even though the guide may not be integral with the tensioner via a bracket.

Furthermore, on other engines where the chain tensioner or guide includes a bracket, this bracket typically must be installed prior to the chain and sprockets because the bracket is typically secured to the engine by fasteners located inside the chain path.

Generally, all of these chain tensioners are bolted to either or both the engine block and at least one of the engine heads. Often these are bolted to an external face easily accessible via a cover, however, recently other designs are accessible only via top and bottom access openings into the vertical cavity in which the timing chain is positioned. It is this latter type that is becoming more common; however, it is typically difficult to use with old type tensioners. Briefly, a vertical cast wall replaces the removable cover of the former type and thus restricts lateral access. This results in a need for transverse access above and beyond the above described need based upon positioning the chain and chain tensioner and guide with reference to the sprockets. The overall result of these designs is that transverse access to the chain, chain tensioner, chain guide, and sprockets is often required such as is provided by delay in affixing a laterally securable cover during assembly of the engine, and removal of the cover during repair or replacement of these components after use of the engine.

These newer block and head designs which include a vertical cast wall as part of the block and head instead of a removable cover, as needed with old designs, have generated a need for new tensioner assemblies that are mountable in new ways. Specifically, lateral or transverse access to the tensioner, chain, sprockets and other parts is impossible because of lateral walls completely enveloping the central portion of the vertical cavity housing the tensioner, chain, sprockets, etc. Instead, access is only provided longitudinally from end windows at the top and/or bottom of the vertical cavity.

Therefore, the installation of the cam drive components is either impossible in the known lateral manner via a cover, or significantly more difficult on these new engines because of this vertical wall that is integral to the engine block (or case) and head. An arrangement of this type requires an installation procedure by which the chain and tensioners are placed in position through a window access that is planar to the final chain position, that is, access is only possible longitudinally from above or below the vertical cavity. The present designs do not meet these constraints of being longitudinally installable where lateral access to the chain and sprockets is not available.

In addition, chain tensioners typically include a spring mechanically interlocked within a shoe where the shoe is adapted to contact a chain to be tensioned. Once the spring is inserted into the shoe, it is important that the spring remains properly positioned and does not become dislodged during shipping and installation of the entire chain tensioner assembly, and during actual tensioning. The spring is loaded such that deflection is typically required to insert the spring into the shoe. However, means for retaining the spring within the shoe are needed to assure proper positioning and continued lodging of the spring within the shoe.

Prior art tensioner have used pins and retainers that are supplementally added to hold the spring S in place. Many of these designs are intricate and thus difficult to position. For these and other various reasons, these and other present designs do not meet the present requirements that the tensioner be simple, compact, reliable, easy to manufacture, and easy to install and remove.

SUMMARY OF THE INVENTION

The present invention is directed to a chain tensioner apparatus, and related method of installation and removal thereof, that is useful for applying a tensioning force to a chain traveling therepast where the engine components, such as an engine block and head, housing the sprockets do not contain a removable access cover that provides lateral access to the chain guide and tensioner apparatus for replacement thereof.

The principle object of this invention is to provide a tensioning device that allows for cam drive component installation including chain, sprockets, and tensioner, in those engines having severe packaging restrictions including limited space and access in the transverse direction in relation to the vertical wall integral with the engine block and head.

This object is met by a chain tensioning system for tensioning a chain mounted between sprockets in a cavity defined by an engine head and an engine case. The system housed in an engine head with a first elongated cavity with a first sprocket therein, and an engine case structure with a second elongated cavity with a second sprocket therein, where the first and second cavities are alignable to define a system housing cavity defined by lateral walls completely prohibiting lateral access to the system housing cavity, and including at least one end capable of providing longitudinal access to the system housing cavity. In addition, a chain to be tensioned is looped around the first and second sprockets capable of taut revolution. The system includes an elongated shoe adapted to contact the chain to be tensioned where the shoe capable of longitudinal insertion into, retainment therein, and removal therefrom the system housing cavity via the at least one end, and an elongated spring capable of lateral insertion in, connection to, and removal from the elongated chain tensioning shoe.

A second important object is retention of the spring within the shoe after insertion of the spring within the shoe. The spring is often inserted into the shoe prior to tensioner insertion into the engine. It is therefore important that the spring is retained in the shoe during shipping and installation. Furthermore, the bracket in this invention is not used to retain the spring so spring retention after installation, that is, during engine operation, is also important.

This object is met by a chain tensioning apparatus mounted on a support structure where the apparatus is for tensioning a chain in a timing chain assembly with a pair of sprockets operatively connected by a chain. The apparatus including an elongated shoe with first and second enlarged ends spaced apart along a longitudinal axis and joined by an elongated central body section where the enlarged ends each have a narrow slot extending laterally into the enlarged end as well as a surface within each narrow slot having a ramp thereon. The apparatus also including an elongated spring with first and second ends each that each have a locking slot extending longitudinally into the spring where the spring is laterally insertable into the slots of the elongated shoe and terminates in first and second ends of the elongated shoe after locking over the ramp.

Further advantages and scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention exists in the construction, arrangement, and combination of the various parts of the device, whereby the objects contemplated are attained as hereinafter more particularly set forth, specifically pointed out in the claims, and illustrated in the accompanying drawings in which:

DETAILED DESCRIPTION OF THE PREFERRED EMBODIMENT

Figure 1:
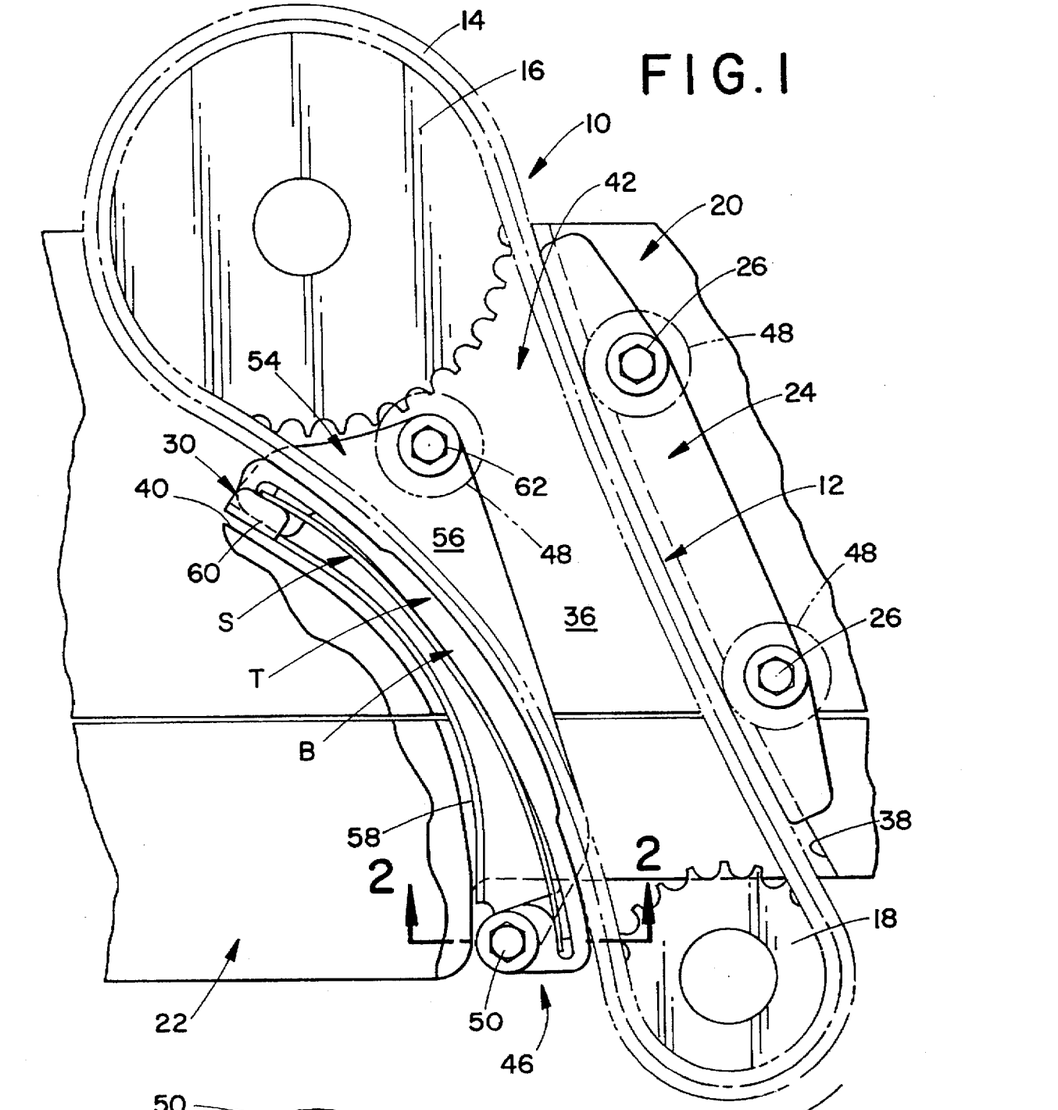
FIG. 1 is a front view of a first embodiment of a chain drive mechanism including a tensioner and a bracket with the nonremovable front lateral wall of the engine cut away for clarity.
Figure 2:
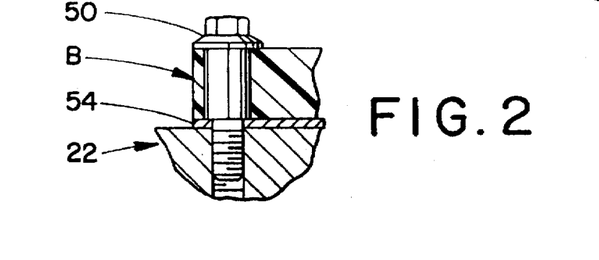
FIG. 2 is a partial sectional view of the shoulder bolt securing the tensioner and bracket to the engine taken along line 2—2 in FIG. 1.
Figure 3:
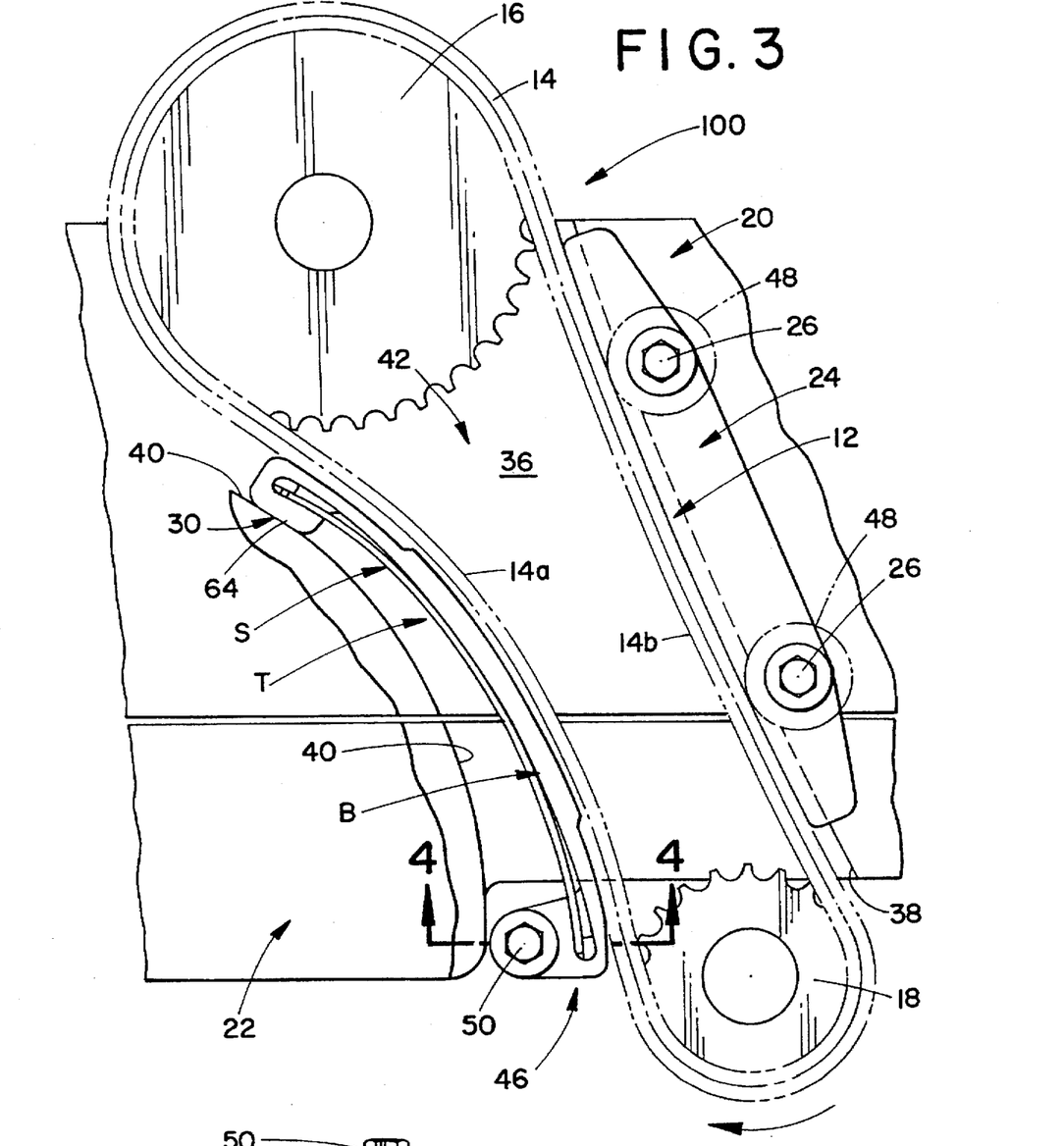
FIG. 3 is a front view of a second embodiment of a chain drive mechanism including a tensioner but no bracket with the nonremovable front lateral wall of the engine cut away for clarity.
Figure 4:
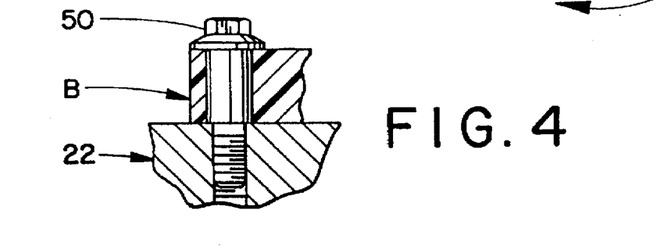
FIG. 4 is a partial sectional view of the shoulder bolt securing the tensioner to the engine taken along line 4—4 in FIG. 3.

Referring more particularly to the drawings wherein the showings are for the purpose of illustrating two embodiments of the invention only, and not for the purpose of limiting same, FIG. 1 shows the overall arrangement of a first embodiment of an improved chain tensioning-bracket apparatus 10. Similarly, FIG. 3 shows the overall arrangement of a second embodiment of an improved chain tensioning apparatus 100 without a bracket. The tensioning assembly 100 functions in an identical manner to that of the first embodiment but without the use of a bracket such as that of the first embodiment.

As to some of the other figures, the particular details of a tensioner T used in conjunction with either the chain tensioning-bracket apparatus 10, or the chain tensioning apparatus 100 without a bracket are shown in FIGS. 6–13. In addition, FIGS. 14–15, and 16–17 show two other embodiments of tensioners T' and T" generally interchangeable with tensioner T.

Overall, the chain tensioning-bracket apparatus 10 of FIG. 1, or the chain tensioning apparatus 100 of FIG. 3, are designed for use in any situation requiring the tensioning of a chain such as on internal combustion engines where a chain drive is used for timing purposes. Both of the tensioner apparatus 10 and 100 are particularly useful in short center distance cam-in-block automotive engine camshaft drives where minimal available packaging space adversely influences accessibility. Furthermore, both of the tensioner apparatus 10 and 100 include tensioner T with a blade or shoe B and a spring S.

In the first embodiment as shown in FIG. 1, and in the second embodiment as shown in FIG. 3, the tensioner T is used on a chain drive assembly 12 comprising a chain 14 rotatably operable between a pair of spaced sprockets 16 and 18 respectively mounted on shafts (not shown) in a first engine structure 20 and a second engine structure 22, respectively. Specifically, the embodiments show, but are not limited to, a compound or secondary drive where a chain 14 is looped around a large driven sprocket 16 in an engine head 20 for driving the cam, and a smaller intermediate drive sprocket 18 in an engine case or block 22 which drives a shaft for use with peripheral engine features such as the oil pump, power steering pump, and air conditioning compressor. The intermediate drive sprocket is then typically looped via an additional chain around a crank sprocket (not shown) thereby defining the primary drive.

In addition, in some scenarios, a guide 24 is used in conjunction with the tensioner 10 on the taut strand or run 14b of the chain 14 based upon the distance between the sprockets and the amount of slack occurring within the chain. This guide when used may be of any known conventional constructions. Guide 24 may be affixed in any known manner including by fasteners such as bolts 26.

The run 14a of the chain 14 is engaged by the tensioner T in a conventional manner which will subsequently be described in greater detail. Similarly, where a guide 24 is present, the run 14b of the chain 14 is engaged by the guide 24 in a conventional manner which is well known in the art.

Figure 6:
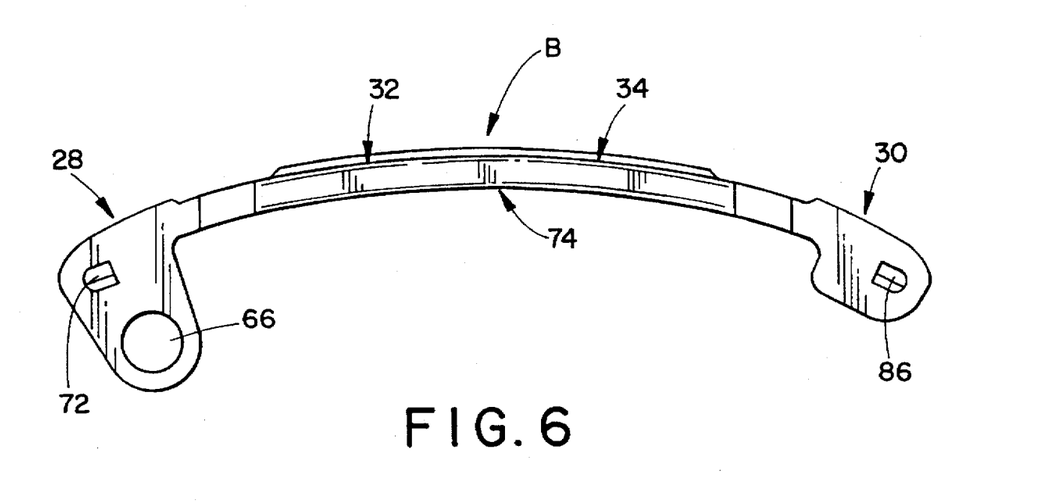
FIG. 6 is a side view of the tensioner shoe of either FIG. 1 or 2 taken from the closed side or side opposite the slots.
Figure 7:
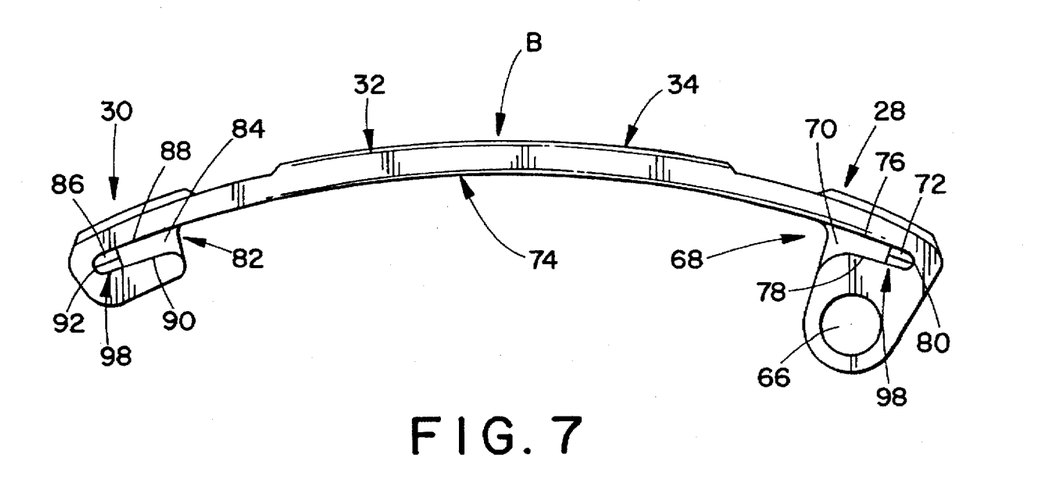
FIG. 7 is a side view of the open or slotted side of the tensioner as is shown in FIG. 6.
Figure 8:
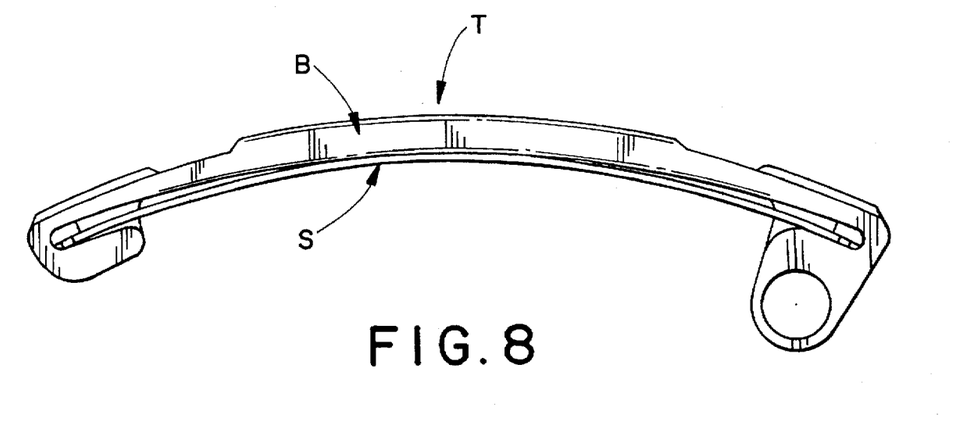
FIG. 8 is a side view of the tensioner of FIG. 7.
Figure 9:
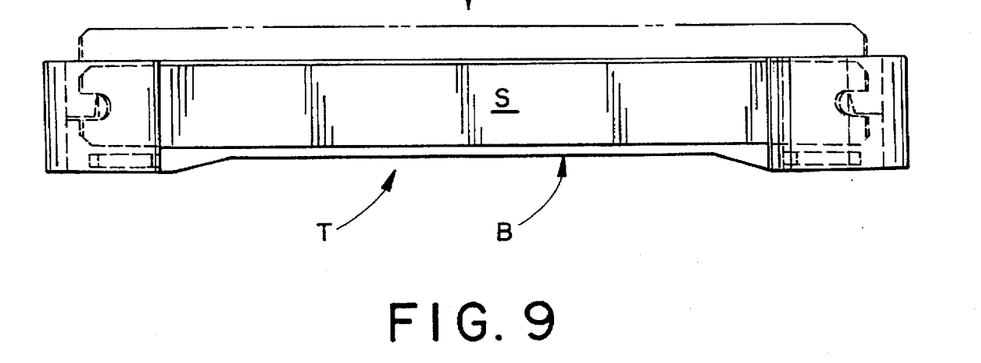
FIG. 9 is a bottom plan view showing insertion of the spring.
Figure 10:
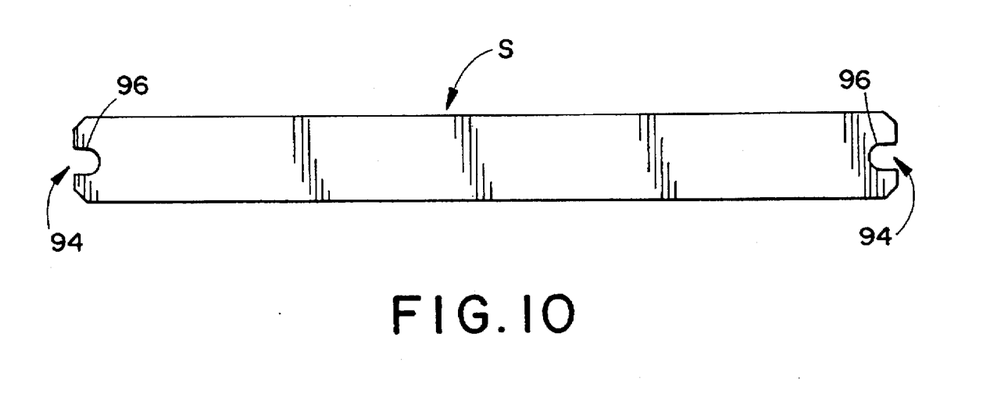
FIG. 10 is a top view of the spring prior to forming.
Figure 11:
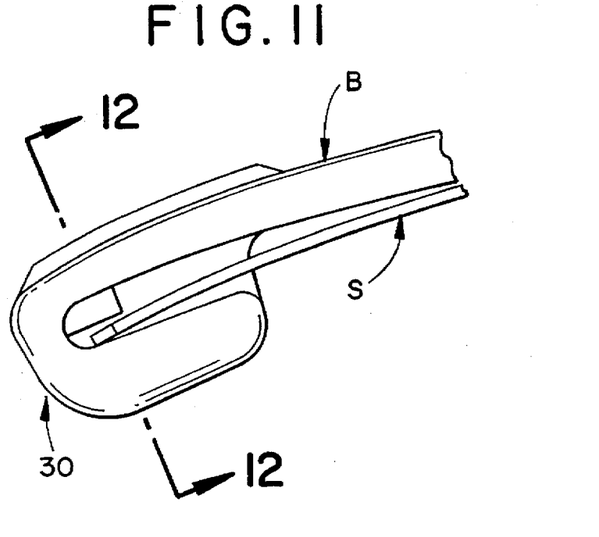
FIG. 11 is an enlarged view of one of the enlarged ends of the shoe and spring in FIGS. 6–8.
Figure 12:
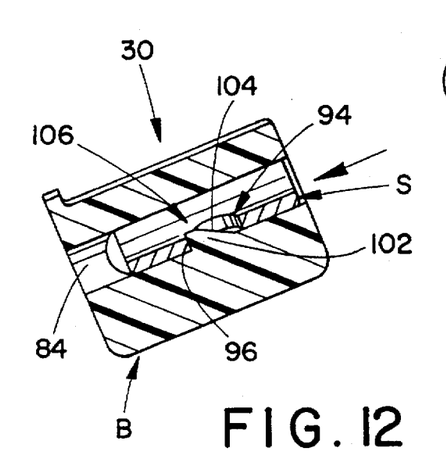
FIG. 12 is a cross sectional view of the shoe, spring, and ramp in a slot in the shoe as taken along 12—12 in FIG. 11.
Figure 13:
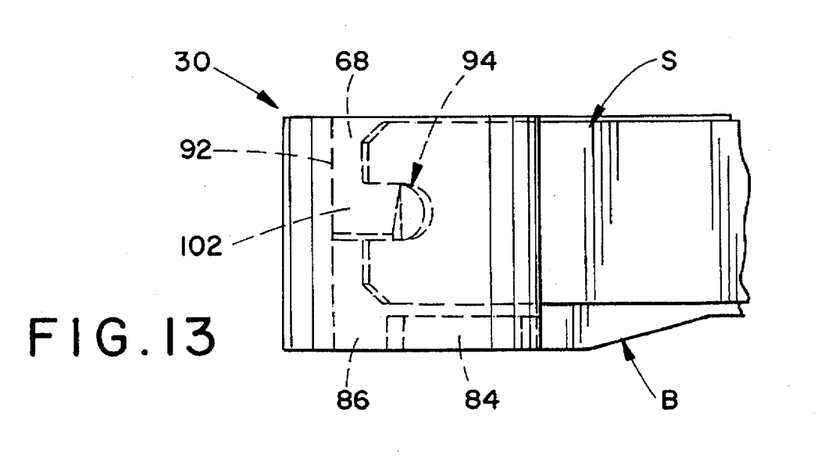
FIG. 13 is a plan view of one of the enlarged ends of the shoe and blade as is shown in FIG. 11.

In the embodiment illustrated, particularly in detail in FIGS. 6–7, the shoe B has first and second enlarged, or barrel, end portions 28 and 30 that are joined by a relatively thin and flexible central section 32. A first exterior guide surface 34 extends the length of the lateral side of the body between the first end 28 and the second end 30, and is relatively smooth such that it is adapted to engage and apply the necessary tension forces to the chain run 14a. The surface 34 is also flat in its width direction, but is slightly curved throughout its length.

Figure 5:
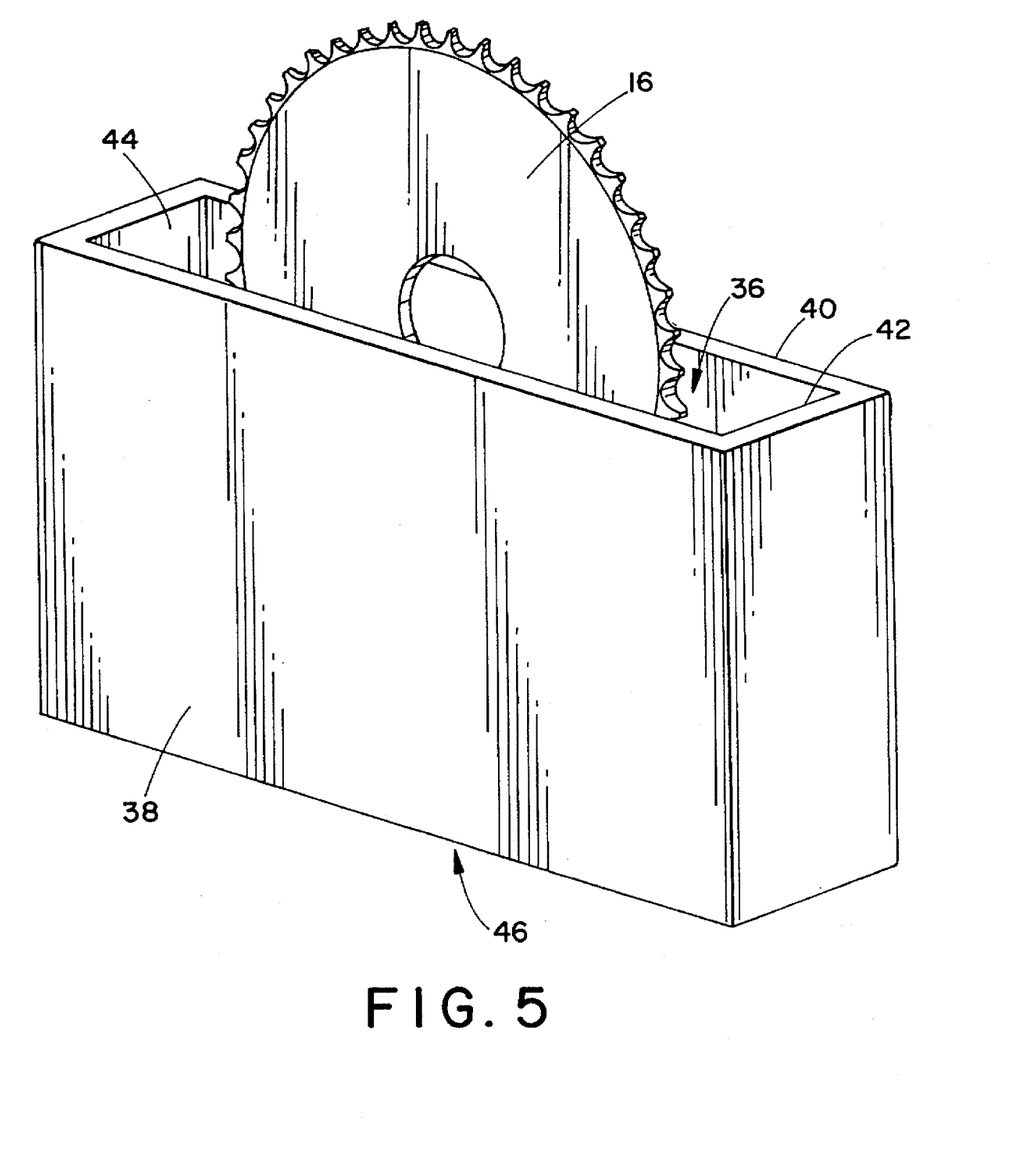
FIG. 5 is a top isometric view of a head showing the vertical cavity in which the chain drive assembly and tensioner assembly must be assembled.

The chain drive assembly 12 and the tensioner T are mounted and function within an elongated, vertical cavity 36 defined through the head 20 and block 22. A portion of the head 20, block 22, and the narrow vertical cavity 36 without lateral access defined therein are shown in FIGS. 1 and 3 with the chain drive assembly 12 operable and positioned within the cavity. Specifically, FIGS. 1 and 3 show the vertical cavity 36 as defined between a vertical wall 38 in close proximity to the taut strand guide 24, and an interior wall 40 in close proximity to tensioner 10. In addition, two other walls 42 and 44 as shown in FIG. 5 define the packaging parameters and clearance area in which the chain drive assembly 12 and the tensioner T must fit into and be assembled therein. This cavity is typically cast during the manufacture of the head 20 and block 22 and therefore is not accessible in a lateral manner as in the prior art by removable covers and the like. Instead, the vertical cavity 36 is only accessible from either the top or the bottom through an end window 46.

Access holes 48 in one of the side walls in the head 20 provide access from outside of this cast vertical cavity such that the bolts 26 and 62 may be inserted into its respective hole in the head for securing the guide 24 and any bracket as needed and described below to the head respectively. In contrast, a shoulder bolt 50 is not covered by the walls defining the vertical cavity and is thus exposed for easy access. Other engine parts that are removable such as the transmission cover the shoulder bolt 50 from exposure.

Each access hole 48 is capable of receiving a pressurizable and sealable plug after the bolt has been inserted therethrough and tightened. These plugs then seal the vertical cavity.

In the first embodiment as shown in FIG. 1, a mounting bracket 54 is used to support the tensioner T. The mounting bracket includes a lateral side wall 56 mounted against one of the lateral walls 42 of the vertical cavity. The shoe is positioned within the bracket such that any spring access slots within the shoe as are described below are not covered by the mounting bracket 54, that is, the mounting bracket 54 does not retain the blade within the shoe.

The shoe B is retained in position on the bracket by having its first end 28 affixed by the bracket 54 through the transversely extending shoulder bolt 42. A suitable opening is formed on bracket 54 to receive the shoulder bolt 50.

A suitable strengthening or rigidity providing flange 58 extends across the entire width of the bracket 54 closely adjacent an interior wall 42 of the head and block. At the end of flange 58 that acts as a ramp for the tensioner, there is a laterally extending retaining tab means 60. The retaining tab means 60 is spaced outwardly from the side wall 56 a distance such that it engages the upper surface of the enlarged end 30 of shoe B. The tab retaining means 60 thus acts to retain the shoe B in proper lateral relationship with the bracket 54. Additionally, the shoe B can flex, and the distance between the enlarged ends 28 and 30 change as necessary during the lateral flexure of the shoe B.

The bracket 54 can be mounted relative to the chain drive so as to place tension on chain 14 using bolt 50 and a pin or bolt 62. Bolt 50, also referred to as a shoulder bolt, secures both shoe B and bracket 54 to wall 42 in the vertical cavity 36 as is clearly shown in FIG. 1. Bolt 62 extends through a hole in the bracket and engages the head in between the chain sections 14a and 14b. The shoe is selectively removable from the bracket and thus the vertical cavity by removal of the shoulder bolt 50. This allows initial installation of the shoe to occur after bracket and subsequent chain installation, and this also allows repair or replacement of the shoe to occur when needed without necessitating removal of the chain and then the bracket.

Alternatively as is shown in FIG. 3, tensioner T may be mounted within the vertical cavity without the use of a bracket. In this case, the enlarged end 30 is positioned against the interior wall 40 such that the end engages a reaction surface rather than the tab on said bracket. This reaction surface 64 is either an additional element on the head or is a portion of the interior wall adjacent the second enlarged end 30 when properly positioned. The access hole 48 associated with the bracket 54 is also removed.

In either case of a tensioner T with or without a bracket, the tensioner T is both installable and removable from the vertical cavity 36 either prior to installation or after removal of a small cover (not shown) that covers the lower sprocket and either prior to engagement or after disengagement of the shoulder bolt 50. Generally, the tensioner T is longitudinally inserted and withdrawn via end window 46, that is, the tensioner T slides in and out along the length of chain 14 until fully inserted whereby a fastener hole 66 in enlarged end 28 aligns with the hole in the block, or fully removed adjacent the lower sprocket.

Specifically, installation of the tensioner T occurs through a bottom window access 46 to the vertical cavity 36 in this case, although installation through a top window access is also possible. The tensioner T is installed through this window such that the second enlarged end 30 is tightly squeezed between the chain 14 and either tab 60 (in the first embodiment as is shown in FIG. 1)) or wall 40 (in the second embodiment as is shown in FIG. 3) thereby securing it in place without the need for any additional fastener such as a bolt or pin.

The shoulder bolt 50 is then used to fasten the other end of the shoe, that is the first enlarged end 28, thereby exerting tension upon the chain 14. The shoulder bolt 50 fastens the bracket 54, if used, and spring S to the block. More importantly, the shoulder bolt and end window access allows for the tensioner T to be installed last since the chain 14 cannot be installed in this tight packaging area if the guide 24 and the tensioner T are already in place.

It is also an advantage to install the tensioner T last because it provides significant practical advantages in that the sprockets 20 and 22, having the chain 14 disposed therearound, are installed on the shafts, before the shoe B and spring S are engaged or even positioned on the bracket 54. Shoe B is, thus, not in a position to interfere with any initial positioning of the chain. Since no assembly clearance is required, as the chain is already in place when the shoe B is installed, and the tolerances related to the tensioner T are not even taken into account, as the apparatus is installed last, installation is greatly simplified. Therefore, with respect to the method for installing either the chain tensioning-bracket apparatus 10, or the chain tensioning apparatus 100 without a bracket of the present invention, unlike the prior art devices or the previously described embodiment, the present development is significant in that it allows for the installation of, first, any guide 24 if necessary; second, the chain 14 and sprockets 20 and 22; and, third, the tensioner T comprising a shoe B and a spring S.

When repairs or replacement of the tensioner T is necessary, the tensioner T is easily removable by removing any cover on the end window access 46 and disengaging the shoulder bolt 50. The tensioner T then slides out of the end window access.

Specifically, this installation and removal method functions where other tensioners cannot because of severe packaging restrictions as a result of the vertical wall integral with the engine case and head thereby prohibiting lateral access to the tensioner T and the remainder of the chain assembly.

In more detail and as illustrated in FIGS. 6–13, the tensioner T used in conjunction with the chain tensioning-bracket apparatus 10 or the chain tensioning apparatus 100 comprises the elongated shoe or blade member B and the spring S. The shoe member B is formed of a suitable resinous plastic material, such as heat stabilized nylon or other engineering plastic, which has the necessary rigidity (for damping purposes) and wear properties under elevated temperatures that might be encountered in an engine environment. In contrast, the spring S is formed of a suitable material which has the necessary rigidity and load-carrying capabilities under elevated temperatures that might be encountered in an engine environment.

In the embodiment illustrated, particularly in detail in FIGS. 6–7, the shoe generally includes first and second enlarged ends 28 and 30 with a central section 32 therebetween. The first end has a fastener hole 66 therein.

The enlarged first end 28 of the shoe B is provided with a relatively narrow slot 68 that extends laterally inward. Specifically, slot 68 extends inwardly from one lateral side nearly completely through the width dimension of the end portion 28 to a wall 70 with a spring disengaging access hole 72 therein. The slot 68 is in arcuate alignment with a second exterior surface 74 formed on the central body section 32. It should be noted that exterior surface 74 is generally parallel to the first exterior guide surface 34. The slot 68 is defined by parallel surfaces 76 and 78, where surface 76 is in substantial alignment with the second exterior surface 74 and surface 78 is in parallel configuration and set apart therefrom a distance sufficiently larger than the width of the spring S to allow deflection of the spring during insertion. The slot 68 is further defined by an end surface 80 that restricts longitudinal movement of the spring S any further into the enlarged end, and the wall 70.

The second enlarged end portion 30 is likewise provided with a relatively narrow slot 82 that extends laterally inward and is also aligned in an arcuate manner with the surface 74 along its slightly curved contour. Slot 82, like slot 68, extends inwardly substantially the full width of the shoe B and similarly stops at a wall 84 with a spring disengaging access hole 86 therein. The slot 82 is also similarly defined by parallel surfaces 88 and 90 where surface 88 is in substantial alignment with the second exterior surface and surface 90 is in parallel configuration and set apart therefrom a distance sufficiently larger than the width of the spring S to allow deflection of the spring S during insertion. The slot 82 is further defined by an end surface 92 that restricts axial movement of the spring S any further into the enlarged end, and the wall 84. Both slots 68 and 82 extend laterally inward from the same side of the shoe.

The tensioner T also includes the spring S. This spring S is of a generally rectangular configuration with a length only slightly less than the overall length of the shoe B. The width of the spring S is only slightly less than the total width of the shoe B. The spring S functions to provide the necessary longitudinal rigidity and lateral flexibility required for the shoe B. The spring S of the subject embodiment is received laterally into the shoe B with its respective first and second ends received in the slots 68 and 82 of the first and second ends of the shoe B. The relative sizes of the slots 68 and 82 compared to the spring S are such as to allow the spring S to completely fill the slots in their lateral depth direction.

In both ends of the spring S is an arcuate slot 94 such that the ends of the spring S are forked in configuration. These slots 94 extend axially into the spring S and define a locking ridge 96. This arcuate slot 94 engages a positive retention feature 98 on a surface in the slot as described below for retaining the spring S, within the shoe B.

This positive retention feature 98 is positioned within each of the slots 68 and 82. Each of these slots extends laterally inward from one lateral side of shoe B. When a bracket 54 is used in conjunction with shoe B, the bracket may be positioned such that either (1) the bracket is adjacent to and covers the open side of slots 68 and 82, or (2) in the alternative is adjacent to the opposite side of the shoe and thus does not cover the slots 68 and 82 at all (as is shown in FIG. 1). This ability to position the bracket on either side is based on the positive retention feature 98 assuring that spring S remains within the slots 68 and 82 at all times. The spring S will remain in the slots 68 and 82 and against the positive retention feature 98 because the spring must be bent or loaded to be inserted into the slots and once installed within the slots remains under load.

In addition, the spring S and shoe B combination is often handled separate from the other components such as during shipping prior to assembly of the engine, and therefore subject to dislodging of the spring S from the shoe B due to vibrations, sudden shocks, or other disruptions to the loaded end deflected spring S. Therefore, the positive retention feature 98 as shown in FIGS. 6–13 is added to the shoe B to provide assurances that the spring S will remain properly positioned and loaded therein.

The positive retention feature 98 is a ramp 102 on surfaces 78 and 90 in each slot 68 and 82 in shoe B. Each ramp 102 has an angled surface 104 rising up from surfaces 78 and 90 from the open end of the slot. The angled surface 104 in each ramp ends at a retaining ridge 106 that is perpendicular to and intersecting with surfaces 78 and 90, respectively.

The spring installation position (geometry or spring position) is designed to be very near the elastic limit of the material. This will serve to maximize the tensioner take-up capability over the life of the system. Typically the spring S can be deflected during insertion so as not to lose any take-up capability.

During insertion of spring S into the slots 68 and 82 in the shoe B, the spring S is initially deflected to align the spring S with the slots. This deflection results in a loaded spring that remains loaded as long as it is maintained in the deflected position. As the spring S is further inserted in the direction of the arrow A, the spring S encounters the ramps 102. The ramps 102 cause the spring S to further deflect by acting as a cam which forces the spring S to follow the angled surfaces 104. Once the locking ridge 96 at each end of the spring S reaches the top of the angled surfaces 104, respectively, the spring S snaps over the ramps 102 such that each of the locking ridges 96 are engaged and retained by retaining ridges 106. The spring S is retained within the shoe B in a loaded position.

Alternatively, during insertion of spring S into the slots 68 and 82 in the shoe B, both the spring S and shoe may be deflected to align the spring S with the slots. Specifically, rather than risk overstressing, or actual overstress of, the spring S during deflection as needed for insertion to get over the ramps, an alternative insertion strategy involves both the spring S and shoe being deflected in lesser amounts. The deflection of the spring S can therefore be limited to deflection less than the elastic limit, while the plastic shoe is only slightly deflected to compensate. In practice, the spring S is deflected to less than the elastic limit such that the spring S has less curvature, while the plastic shoe is deflected slightly to increase curvature so as to align the shoe with the spring curvature such that insertion easily occurs. The deflections may be such that the spring S slides into the shoe without encountering the ramps, or so as to encounter the ramps and deflect slightly more. In either case, the spring is loaded upon deflection and remains loaded once installed.

Figure 14:
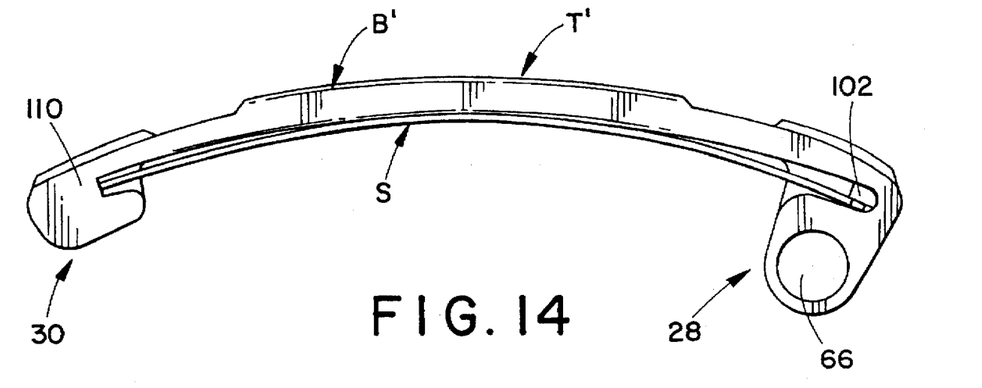
FIG. 14 is an alternative diagonal install embodiment of the shoe and blade.
Figure 15:
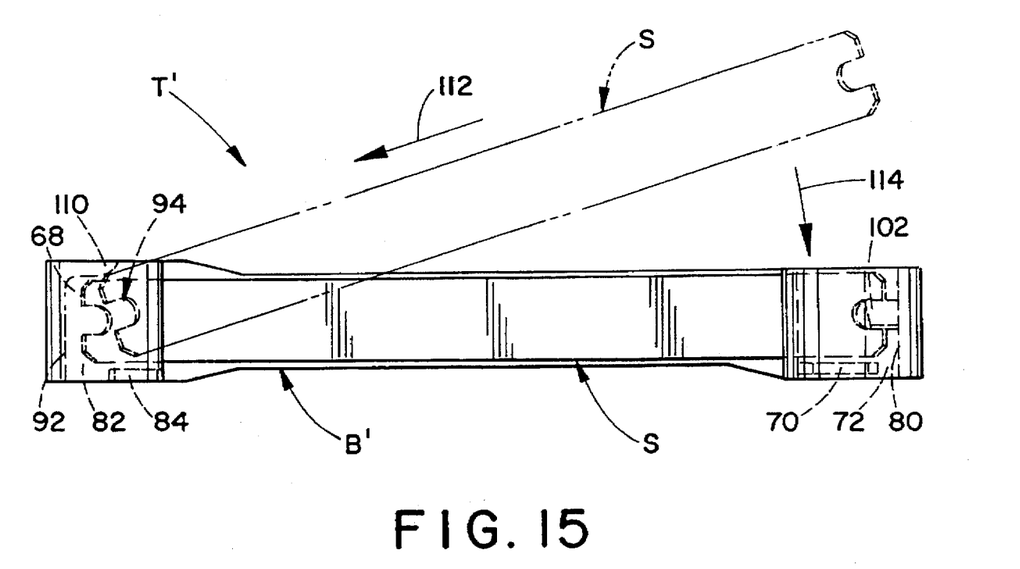
FIG. 15 is a plan view showing installation of the embodiment shown in FIG. 14.

FIGS. 14-15 show an alternative embodiment of the tensioner as tensioner T'. This tensioner uses an identical spring S but a modified shoe B'. Instead of parallel lateral insertion as occurred in tensioner T, the spring S is inserted diagonally and then pivotally into the shoe B'. Specifically, the second end portion 30 of the shoe B' does not contain a ramp 102 and instead includes a short wall or stop 110 on the previously opened side of slot 68. Installation occurs by first diagonally inserting the spring S in this modified end as is shown at arrow 112 followed by pivoting the spring S into the shoe B' as is shown by arrow 114.

Figure 16:
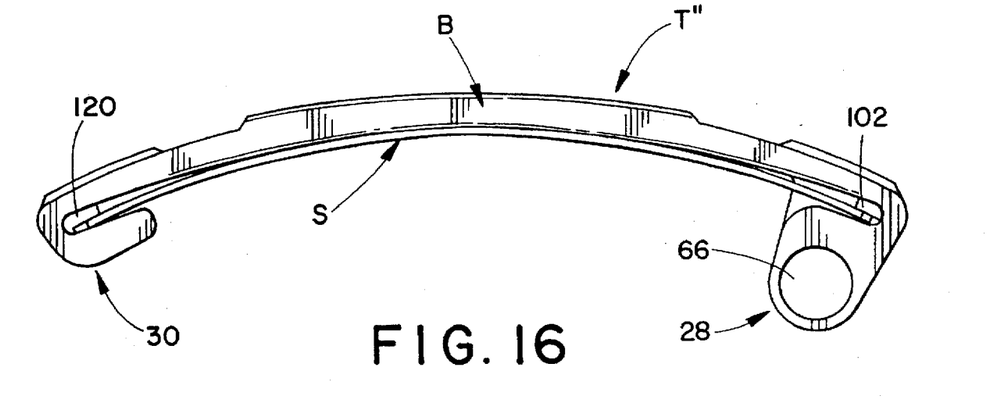
FIG. 16 is an alternative diagonal and slot-lock embodiment of the shoe and blade; and, FIG. 17 is a plan view showing installation of the embodiment shown in FIG. 16.
Figure 17:
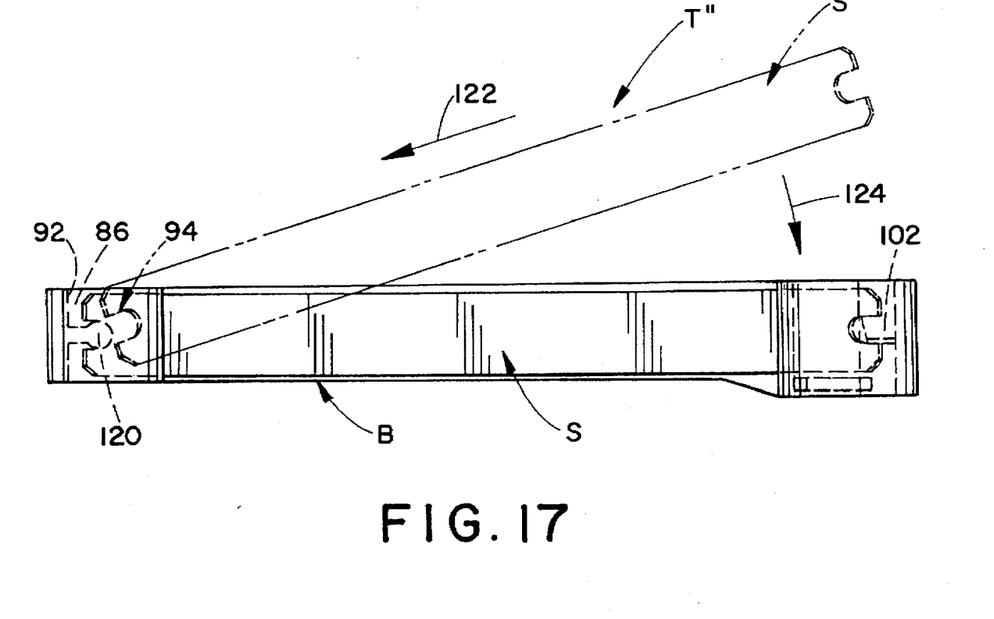

A further alternative embodiment is shown in FIGS. 16 and 17, where instead of a ramp or a short wall, a male adaptor 120 extends from parallel surface 76 to parallel surface 78 in end portion 30. One of the arcuate slots 94 in the spring S is diagonally inserted as shown by arrow 122 so as to engage this male adaptor 120 and then the spring S is pivoted into the shoe B" as is shown by arrow 124. This embodiment also lacks wall 84 and 86 as needed in previous embodiments.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A chain tensioning apparatus mounted on a support structure, said apparatus for tensioning a chain in a timing chain assembly having a pair of sprockets operatively connected by a chain, the chain tensioning apparatus comprising:

an elongated shoe having first and second enlarged ends spaced apart along a longitudinal axis and joined by an elongated central body section, the enlarged ends each having a narrow slot extending laterally into the enlarged end, and a surface within each narrow slot having a ramp thereon, said ramp being increasingly offset from said surface in a direction perpendicular to the longitudinal axis; and, an elongated spring having first and second ends each having a locking face extending longitudinally into the spring, the spring insertable into the slots of the elongated shoe in a direction perpendicular to the longitudinal axis and terminating in first and second ends of the elongated shoe after locking over the ramp whereby the spring extends longitudinally of the shoe generally parallel to the elongated central body.

2. The tensioner of claim 1 wherein the shoe comprises an exterior wall surface extending the length of the shoe adapted to engage the chain to be tensioned.

3. The tensioner of claim 1 wherein each slot has a base surface for engaging the spring which deflected during insertion, and a back surface for restricting axial longitudinal movement of the spring once positioned within the slots.

4. The tensioner of claim 3 wherein the ramp is approximately laterally centered in each slot along the base surface, while longitudinally positioned approximately adjacent the back surface.

5. The tensioner of claim 4 wherein the ramp includes a camming surface that causes deflection of the spring during insertion.

6. The tensioner of claim 5 wherein the ramp further includes a restraining surface substantially perpendicular to the base surface of the slot, the restraining surface for restricting lateral movement of the spring when fully inserted over the ramp.

7. A chain tensioning apparatus for tensioning a chain mounted on a support structure, the apparatus comprising:

an elongated shoe having first and second enlarged ends longitudinally spaced apart and joined by an elongated central body section, the enlarged ends each having a narrow slot extending laterally into the enlarged end, and a surface within each narrow slot having spring removal limiting means thereon; and, an elongated spring having first and second ends each having a longitudinal slot extending into the spring from the end, the spring insertable into the slots of the elongated shoe in a direction perpendicular to the longitudinal axis and terminating in first and second ends of the elongated shoe after locking on spring removal limiting means whereby the spring extends longitudinally of the shoe generally parallel to the elongated central body.

8. The tensioner of claim 7 wherein the spring removal limiting means is arranged such that as the spring is inserted in the direction perpendicular to the longitudinal axis the longitudinal slot in the first end of the spring snaps over the ramp and engagement between surfaces of the ramp and the longitudinal slot retains the spring in the shoe.

9. A chain tensioning system for tensioning a chain mounted between sprockets in a cavity defined by an engine head and an engine case, the system comprising:

an engine head having a first elongated cavity with a first sprocket therein;

an engine case structure having a second elongated cavity with a second sprocket therein, the first and second cavities alignable to define a system housing cavity defined by lateral walls completely prohibiting lateral access to the system housing cavity, at least one end capable of providing longitudinal access to the system housing cavity, and a first support hole adjacent to and just outside of the system housing cavity;

a chain to be tensioned and looped around the first and second sprockets capable of taut revolution;

an elongated shoe adapted to contact the chain to be tensioned, and the shoe capable of longitudinal insertion into, retainment therein, and removal therefrom the system housing cavity via the at least one end; and, an elongated spring capable of lateral insertion in, connection to, and removal from the elongated chain tensioning shoe.

10. The chain tensioning system of claim 9 wherein elongated chain tensioning shoe includes first and second enlarged ends longitudinally spaced apart and joined by an elongated central body section, the first enlarged end having a second support hole therein alignable with the first support hole to define a bolt receiving chamber capable of receiving a bolt therein for affixing the shoe to the engine case after the second enlarged end and the central body section are inserted into the system housing cavity.

11. The chain tensioning system of claim 10 wherein the enlarged ends each having a narrow slot extending laterally into the enlarged end, and a surface on each narrow slot having a ramp thereon.

12. The chain tensioning system of claim 10 wherein the elongated spring includes first and second ends each having a locking face extending longitudinally into the spring, the spring laterally insertable into the slots of the elongated shoe and terminating in first and second ends of the elongated shoe after locking over the ramp whereby the spring extends longitudinally of the shoe generally parallel to the elongated central body.

13. The chain tensioning system of claim 9 wherein the elongated shoe has at least one lateral slot therein including a spring retention means thereon.

14. The chain tensioning system of claim 13 wherein the spring retention means comprises a ramp on a surface of the lateral slot.

15. The chain tensioning system of claim 13 wherein the spring retention means comprises a pair of opposing walls within the slot.

16. The chain tensioning system of claim 13 wherein the spring retention means comprises a male adaptor extending out of a surface in the slot.

17. A method of tensioning a chain in a timing chain assembly that is operable with a pair of sprockets, the method comprising:

longitudinally inserting an elongated shoe into a longitudinal system housing cavity defined as extending vertically through a first support structure having a first sprocket therein and a second support structure having a second sprocket therein wherein lateral walls completely prohibiting lateral access to the system housing cavity; and, urging the elongated shoe adapted to contact a chain to be tensioned into contact with a chain extending between the first and second sprockets.

18. The method of claim 17 further comprising the step of:
subsequent to urging the elongated shoe into contact with the chain, fastening the elongated shoe to the second support structure through an end window in the system housing cavity, the end window providing longitudinal access to the system housing cavity.

19. The method of claim 17 further comprising the step of:
prior to longitudinally inserting the elongated shoe, installing the first and second sprockets, and the chain.

20. The method of claim 18 further comprising the step of:
prior to installing the sprockets and the chain, installing a bracket providing a smooth reaction surface against which a first enlarged end of the elongated shoe is wedged during tensioning.

21. The method of claim 19 further comprising the step of:
prior to installing a bracket providing a smooth reaction surface, connecting the previously cast first support structure to the previously cast second support structure thereby defining the longitudinal system housing cavity.

22. The method of claim 17 further comprising the step of:
prior to longitudinally inserting the elongated shoe, installing an elongated spring within the shoe, the spring capable of lateral insertion in, retainment therein, and removal from the elongated chain tensioning shoe.

23. The method of claim 22 further comprising the step of:
retaining the spring within the shoe by retaining means comprising at least one ramp on a surface of at least one slot within the shoe.

24. The method of claim 17 further comprising the step of:
subsequent to fastening the elongated shoe to the second support structure, unfastening the elongated shoe from the second support structure for removal of the elongated shoe with an elongated blade spring therein for replacement thereof, where removal occurs via an end window in the system housing cavity, the end window providing longitudinal access to the system housing cavity while the lateral walls prohibit lateral access.

25. A chain tensioner comprising:

an elongated shoe having first and second longitudinally spaced enlarged ends joined by a central body section, the shoe having an exterior wall surface extending substantially the length thereof to engage a chain to be tensioned, and narrow slots extending laterally into the enlarged ends generally parallel to the exterior wall surface;

a blade spring terminating in first and second ends, the first end having a locking surface extending longitudinally at an interior of the blade spring; and, a ramp formed on an interior surface of the narrow slot at the first enlarged end of the shoe, the ramp having a first surface formed at an acute angle with respect to the interior surface of the narrow slot from which it extends and a second surface for engaging the locking surface of the blade spring and retaining the first end of the blade spring in the shoe.

26. The chain tensioner of claim 25 wherein the second enlarged end of the elongated shoe includes a ramp formed on an interior surface of the narrow slot for engaging a corresponding locking surface on the second end of the blade spring.

27. The chain tensioner of claim 25 wherein the narrow slot at the first enlarged end of the shoe includes first and second side walls and a base, the first side wall facing toward the exterior wall surface which engages the chain, and wherein the ramp is formed on the first side wall of the narrow slot.

28. The chain tensioner of claim 27 wherein the first surface of the ramp is formed at an angle such that a height of the ramp increases toward the base of the narrow slot.

29. The chain tensioner of claim 25 wherein the narrow slot at the second end of the elongated shoe includes first and second walls, a base, and a short wall connecting the first and second walls at a side of the narrow slot opposite the base, and wherein the second end of the spring is inserted entirely between the short wall and the base.

* * * * *